INVENTOR.
Francis H. Scott
BY Herbert Furman
ATTORNEY

April 27, 1965   F. H. SCOTT   3,180,677
VEHICLE BODY

Filed Sept. 18, 1962   2 Sheets-Sheet 2

INVENTOR.
Francis H. Scott
BY
Herbert Furman
ATTORNEY

United States Patent Office 3,180,677
Patented Apr. 27, 1965

3,180,677
VEHICLE BODY
Francis H. Scott, Warren, Mich., assignor to General Motors Corporation, Detroit, Mich., a corporation of Delaware
Filed Sept. 18, 1962, Ser. No. 224,444
7 Claims. (Cl. 296—107)

This invention relates to vehicle bodies and more particularly to a cover arrangement for convertible vehicle bodies.

The cover arrangement of this invention is particularly intended for use with convertible vehicle bodies which include a rigid cover member or hardtop mounted on the body for movement between a normal position over the passenger compartment and a stored position within the body. In the preferred embodiment of the invention, the cover member is mounted on the body for movement longitudinally thereof by a spaced pair of guide channels located within a storage compartment of the body adjacent to and rearwardly of the passenger compartment. The rearward portions of the guide channels are hinged to the forward portions for movement between a position in alignment therewith and a position out of alignment therewith and inwardly of the storage compartment. The movement of the rearward portions of the guide channels is controlled by opening and closing movement of a cover member or closure for the storage compartment. When the passenger compartment cover member has been moved from its normal position over the passenger compartment to a position over the storage compartment, closing movement of the storage compartment closure moves the cover member within the storage compartment to a stored position. Likewise, opening movement of the storage compartment closure moves the passenger compartment cover member to a position over the storage compartment where it can be moved forwardly of the body to its normal position over the passenger compartment.

The primary object of this invention is to provide an improved cover arrangement for convertible vehicle bodies. Another object of this invention is to provide an improved cover arrangement for convertible vehicle bodies which includes a passenger compartment cover movable between a normal position over the passenger compartment and a stored position within a storage compartment adjacent the passenger compartment. A further object of this invention is to provide an improved cover arrangement for a convertible vehicle body which includes a passenger compartment cover member movable between a stored position within a storage compartment and a position over the storage compartment, with the cover member being moved from these positions in response to opening and closing movement of a closure for the storage compartment.

These and other objects of the invention will be readily apparent from the following specification and drawings wherein.

Figure 1:
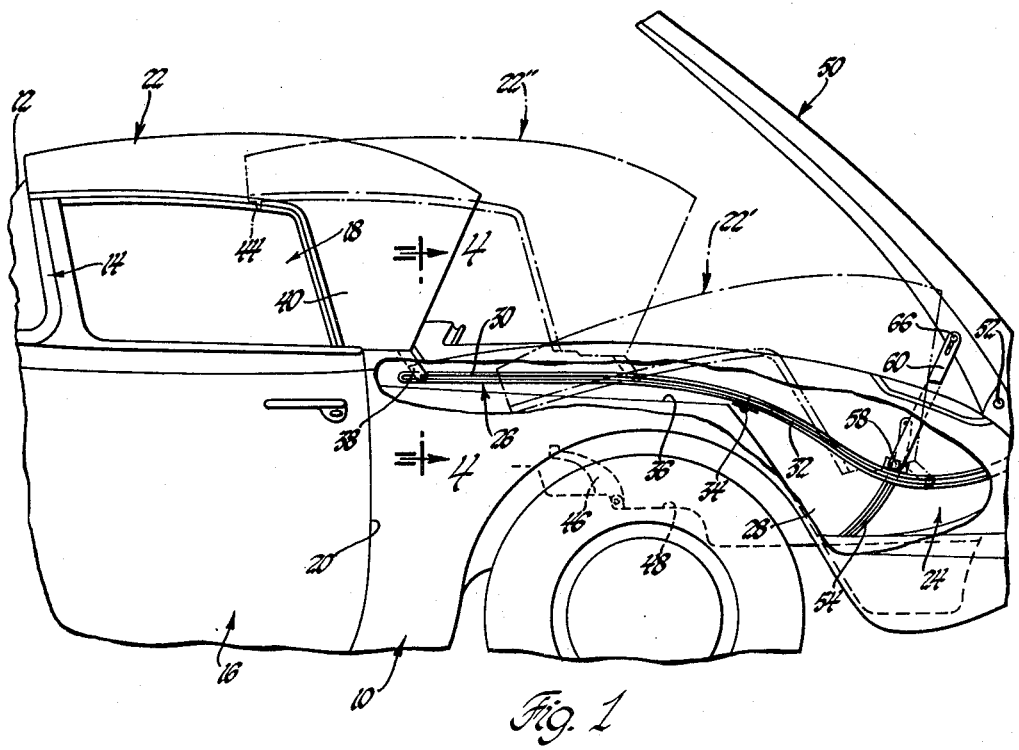
FIGURE 1 is a partially broken away partial side elevational view of a vehicle body embodying a cover arrangement according to this invention, with the passenger compartment cover being shown in full lines in a normal position over the passenger compartment and in dot-dash lines in intermediate positions between the normal position and a stored position within the storage compartment.
Figure 2:
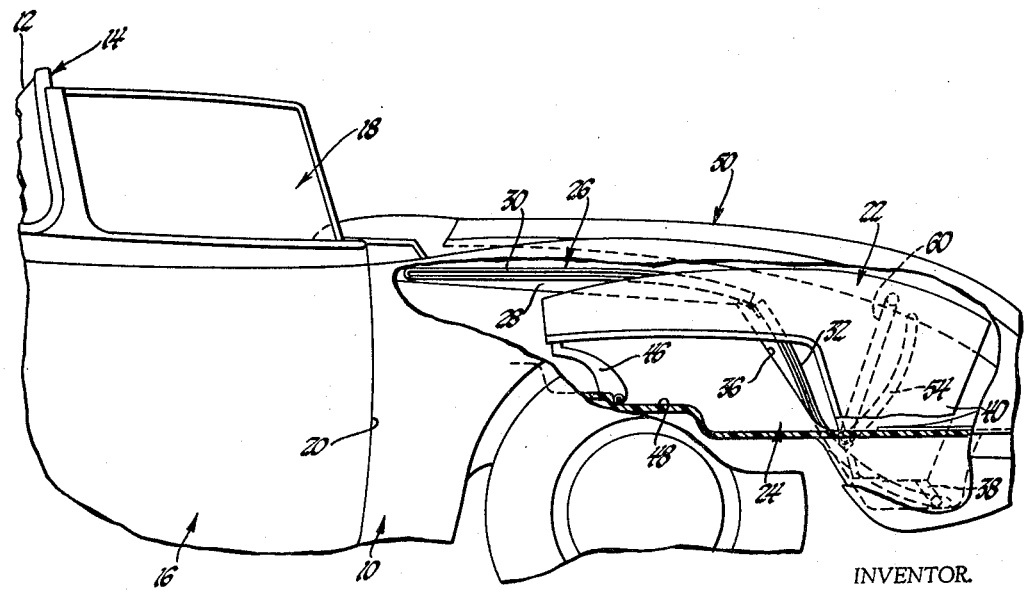
FIGURE 2 is a view similar to FIGURE 1 showing the passenger compartment cover in a stored position within the storage compartment.

Referring now particularly to FIGURES 1 and 2 of the drawings, a convertible vehicle body 10 includes a windshield 12, a windshield header 14, and a front door 16 mounted on the body 10 by suitable hinge means adjacent its forward edge portion for swinging movement between a closed position, as shown, and an open position, not shown, wherein access may be had to the passenger compartment 18 of the body. Suitable latch means, not shown, mounted on door 16 adjacent its rearward edge portion 20 releasably hold the door 16 in its closed position. A rigid passenger compartment cover member or hardtop 22, is mounted on the body 10 for movement between a normal position, as shown in FIGURE 1, wherein cover member 22 covers the passenger compartment 18, and a stored position, as shown in FIGURE 2, wherein the cover member 22 is stored within a storage compartment 24 located rearwardly of and adjacent the passenger compartment 18. The means mounting the cover member 22 on the body 10 for movement between its normal and stored positions is the same at each side of the cover member, and accordingly, only one such means is shown and described and it will be understood that the other is of the same construction but allochiral thereto.

Figure 3:
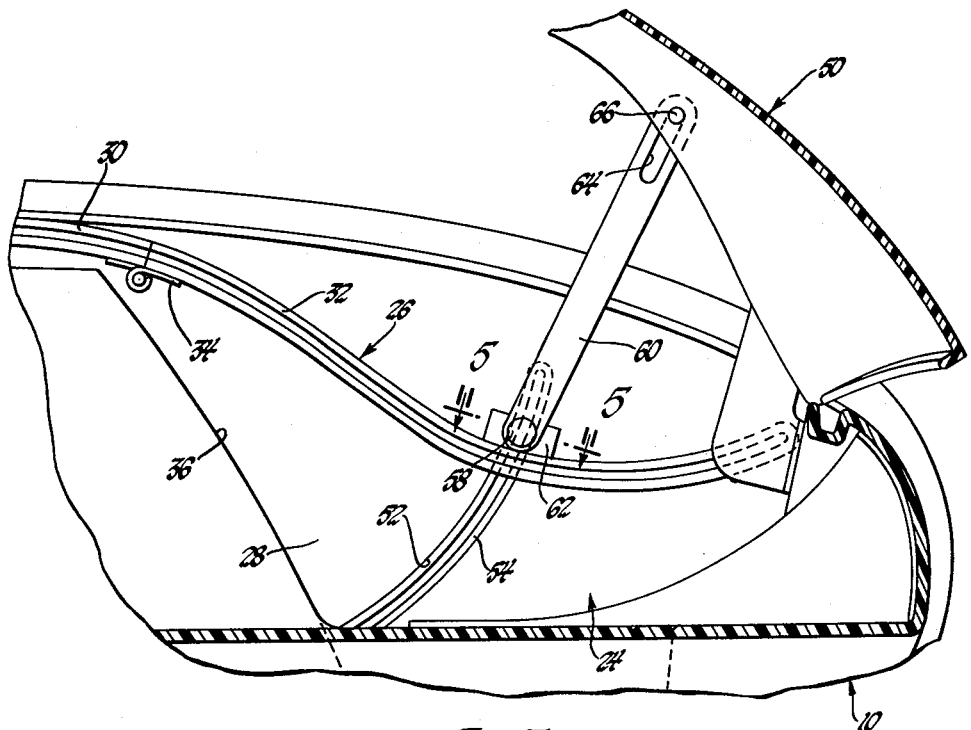
FIGURE 3 is an enlarged broken away view of a portion of FIGURE 1.
Figure 4:
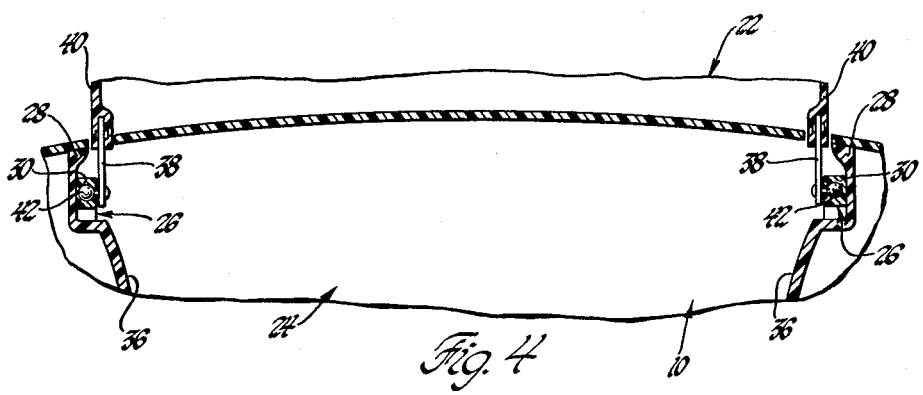
FIGURE 4 is a sectional view taken generally along the plane indicated by line 4—4 of FIGURE 1.

A guide means or guide channel 26 is mounted on the side wall 28, FIGURE 4, of the storage compartment 24 and is generally of C-shaped cross section. The guide channel 26 includes a forward portion 30 fixed to the wall 28 and a rearward portion or movable guide means 32 which is pivotally secured to the forward portion by a conventional hinge 34 for swinging movement between a first or normal position, as shown in FIGURES 1 and 3, wherein portion 32 is in alignment with portion 30, and a second position as shown in FIGURE 2, wherein the portion 32 is located inwardly of the storage compartment 24 in engagement with the rear wall of the body wheelhouse 36 and out of alignment with the forward portion 30. The cover member 22 includes a depending member 38 at its rear quarter portion 40 which pivotally mounts a ball or roller 42 pivotally and slidably received within the guide channel 26 so as to mount the cover 22 on the guide channel for pivotal and sliding movement relative to the body 10.

Figure 5:
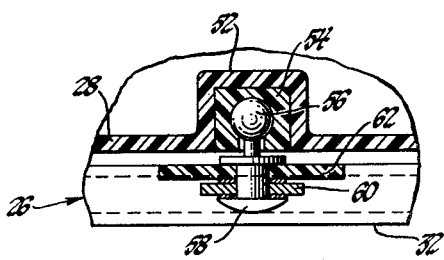
FIGURE 5 is an enlarged sectional view taken generally along the plane indicated by line 5—5 of FIGURE 3.

When the cover member 22 is in its normal position, as shown in FIGURE 1, the forward edge portion thereof rests on the windshield header 14 and may be latched thereto by suitable latch means, not shown, and when the cover member 22 is in its stored position within the storage compartment 24, as shown in FIGURE 2, the forward edge portion of the cover member is located by a stud or pin 44 thereof received within a socket, not shown, provided in an arm 46 mounted on the lower wall 48 of compartment 24 adjacent the inner side wall of wheelhouse 36. The rearward portion 32 of guide channel 26 is moved between its first and second positions in response to movement of a storage compartment cover member or closure 50 which is swingably mounted at 52 on the body 10 for movement between an open position, as shown in FIGURE 1, and a closed position, as shown in FIGURE 2. As best shown in FIGURES 3 and 5, the side wall 28 of compartment 24 is provided with an arcuate channel 52 having its center at the axis of hinge 34. An arcuate generally C-shaped guide channel 54, received within and secured to the channel 52, pivotally and slidably receives a ball or roller member 56 secured to a headed stud 58. Stud 58 pivotally interconnects the lower end of a link 60 and a flange 62 which extends upwardly from rearward portion 32 of guide channel 26. The upper end of link 60 is provided with a closed slot 64 which receives a pin 66 fixed to the closure 50.

Assume now that the cover member 22 is in its normal position, as shown in full lines in FIGURE 1, and that it is desired to move the cover member to its stored position, as shown in full lines in FIGURE 2, within the storage compartment 24 to thereby open the passenger compartment 18 of the body. The operator will first move the closure 50 from its closed position, as shown in FIGURE 2, to its open position, as shown in FIGURE 1, to thereby swing the rearward portion 32 of guide channel 26 to its normal position in alignment with the forward portion 30 of the guide channel. The header latches, if provided, are released and the cover member 22 is moved rearwardly along the guide channel 26 to its dash line partially stored position 22', as shown in FIGURE 1, wherein the roller 42 will be located on the rearward end portion 32 of the channel 26. A position 22' of the cover member 22 intermediate its normal position 22 and its position 22' is shown in FIGURE 1, and it will be noted that the cover member 22 must be manually tilted forwardly and downwardly of the body or swung counterclockwise so as to be moved to its position 22' underneath the open closure member 50. Thereafter, the closure 50 is moved to a closed position and the engagement of the pin 66 with the lower end of the slots 64 will shift the link 60 downwardly and in turn swing the portion 32 of channel 26 downwardly relative to the forward portion 30 to move the cover member 22 from its partially stored position 22' to its fully stored position within the compartment 24, as shown in FIGURE 2. As the portion 32 swings inwardly of the storage compartment 24 to its second position, as shown in FIGURE 2, the cover member 22 will continue to move rearwardly of the body as the roller 42 moves rearwardly along the portion 32 so that the pin 44 may be positioned within the sockets of the arm 46 to thereby locate the cover member 22 within the storage compartment.

It is believed that movement of the cover member 22 from its stored position, as shown in full lines in FIGURE 2, to its normal position, as shown in full lines in FIGURE 1, will be apparent from the preceding description.

In the usual vehicle body, the cover member 22 will taper or flare outwardly of the body from the forward edge portion thereof to the rearward edge portion thereof. Thus, the spacing between the rear quarter portions 40 of the cover member 22 will be greater than the width of the forward edge portion of the cover member 22 so that the cover member 22 must be moved rearwardly of the body wheelhouses 36 before the rear quarter portions 40 of the cover member will fit within the storage compartment. Upon reference to FIGURE 2, it will be noted that the rear quarter portions 40 are located rearwardly of the wheelhouses 36 while the remainder of the cover member easily fits between the wheelhouses in the stored portion of the cover member.

Thus, this invention provides an improved cover arrangement for convertible vehicle bodies.

What is claimed is:

1. The combination comprising, a vehicle body including a compartment therein, a member movable relative to said compartment to a stored position therewithin, guide means guiding movement of said member relative to said compartment, means mounting said guide means on said body for movement inwardly and outwardly relative to said compartment, guided means operatively connected to said member and movable along said guide means to rove said member relative to said compartment, a closure for said compartment movable between open and closed positions with respect thereto, and means interconnecting said closure and said guide means and being operative upon movement of said closure to said closed position thereof for moving said guide means inwardly of said compartment to move said member inwardly of said compartment to said stored position thereof.

2. The combination comprising, a vehicle body including a compartment therein, a member movable relative to said compartment to a stored position therewithin, guide means guiding movement of said member relative to said compartment, means mounting said guide means on said body for swinging movement inwardly and outwardly relative to said compartment, guided means operatively connected to said member and movable along said guide means to move said member relative to said compartment, a closure for said compartment movable between open and closed positions with respect thereto, and means interconnecting said closure and said guide means for swinging said guide means inwardly of said compartment to move said member inwardly of said compartment to said stored position thereof upon movement of said closure to the closed position thereof.

3. The combination comprising, a vehicle body including a compartment therein, a member movable relative to said compartment to a stored position therewithin, guide means guiding movement of said member relative to said compartment, said guide means including a stationary first portion and a movable second portion mounted on said compartment for movement between a first position in alignment with said first portion and a second position out of alignment therewith and inwardly of said compartment, guided means connected to said member and movable along said guide means to move said member relative to said compartment, a closure for said compartment movable between open and closed positions with respect thereto, and means operative upon movement of said closure to said closed position thereof for moving said second portion of said guide means to said second position thereof to move said member inwardly of said compartment to said stored position thereof.

4. The combination comprising, a vehicle body including a compartment therein, a member movable relative to said compartment to a stored position therewithin, guide means guiding movement of said member relative to said compartment, said guide means including a stationary first portion and a second portion pivotally secured to said first portion for movement between a first position in alignment therewith and a second position out of alignment therewith and inwardly of said compartment, guided means connected to said member and movable along said guide means to move said member relative to said compartment, a closure for said compartment movable between open and closed positions with respect thereto, and means interconnecting said closure and said second portion of said guide means for moving said second portion of said guide means to said second position thereof to move said member inwardly of said compartment to said stored position thereof upon closing movement of said closure.

5. The combination comprising, a vehicle body including a compartment therein, a member movable relative to said compartment to a stored position therewithin, a guide channel guiding movement of said member relative to said compartment, said guide channel including a stationary first portion and a movable second portion mounted on said compartment for movement between a first position in alignment with said first portion and a second position out of alignment therewith and inwardly of said compartment, a guide roller mounted on said member and movable along said guide channel to move said member relative to said compartment, a closure for said compartment movable between open and closed positions with respect thereto, and means interconnecting said closure and said second portion of said guide channel for moving said second portion of said guide channel to said second position thereof to move said member inwardly of said compartment to said stored position thereof upon closing movement of said closure.

6. The combination comprising, a vehicle body including a passenger compartment and a storage compartment adjacent said passenger compartment, a cover for said passenger compartment, a closure for said storage compartment movable between open and closed positions with respect thereto, guide means mounted within said storage compartment, guided means mounted on said cover and movable along said guide means for moving said cover relative to said storage compartment between a normal position over said passenger compartment and a second position over said storage compartment, said guide means including a portion movable inwardly and outwardly of said storage compartment, and means operative upon movement of said closure from said open position thereof to said closed position thereof to move said portion of said guide means inwardly of said storage compartment to thereby move said cover from said second position thereo fto a stored position within said storage compartment.

7. The combination comprising, a vehicle body including a passenger compartment and a storage compartment adjacent said passenger compartment, a cover for said passenger compartment, a closure for said storage compartment movable between open and closed positions with respect thereto, guide means mounted within said storage compartment, guided means mounted on said cover and movable along said guide means for moving said cover relative to said storage compartment between a normal position over said passenger compartment and a second position over said storage compartment, said guide means including a forward portion and a rearward portion hinged thereto for movement inwardly and outwardly of said storage compartment, and means operative upon movement of said closure from said open position thereof to said closed position thereof to swing said rearward portion of said guide means inwardly of said storage compartment to thereby move said cover from said second position thereof to a stored position within said storage compartment.

References Cited by the Examiner
UNITED STATES PATENTS 2,768,025  10/56  Spear et al. _____ 296—117
2,827,114  3/58   Stroup _____ 160—209

A. HARRY LEVY, *Primary Examiner.*